W. D. Wrightson,
Animal Trap.

No. 112,403.  Patented Mar. 7, 1871.

Witnesses:
M. Hamilton Johnson
Ewell A. Dick

Inventor:
William D. Wrightson
By his Attorneys
Upperman & Johnson

United States Patent Office.

WILLIAM D. WRIGHTSON, OF QUEENSTOWN, MARYLAND.

Letters Patent No. 112,403, dated March 7, 1871.

IMPROVEMENT IN ANIMAL-TRAPS.

The Schedule referred to in these Letters Patent and making part of the same.

I, WILLIAM D. WRIGHTSON, of Queenstown, in the county of Queen Anne and State of Maryland, have invented a new and useful Improvement in Animal-Traps, of which the following is a specification.

My invention relates to that class of animal-traps having a tilting platform; and It consists of a device, to be more fully hereinafter described, for locking and holding the platform in position until the animal has hold of the bait, and then releasing the platform by unlocking said device, the object and advantage of which is to obtain a self-locking platform, which will not tilt by the weight of the animal until it is in position to be entrapped, thus avoiding the moving of the platform, which always frightens the animal away before it gets in a position to be caught.

In the accompanying drawing—

The frame A may be entirely open, and only sufficient to support the bearings of the moving parts of the trap, a fixed platform, and a box, A', to inclose the bait-holder.

A sheet-metal platform, B, is pivoted to the frame A on a level with the fixed platform, so that when tripped it will turn upon its pivots and dump the animal into a box, F, or other receiver below.

Figure 1:
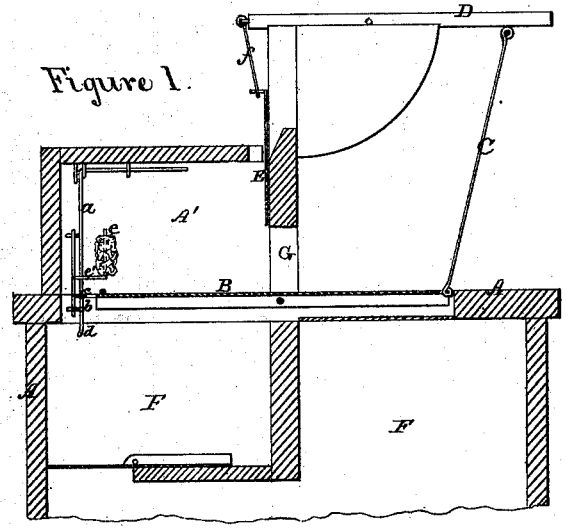
Figure 1 represents a vertical longitudinal section of a trap embracing my improvements, the platform being shown as locked to the bait-holder.
Figure 3:
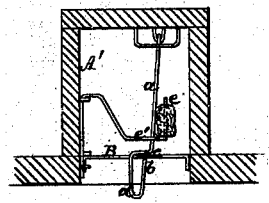
Figure 3 represents an end view of the locking device, bait-holder, and platform.
Figure 2:
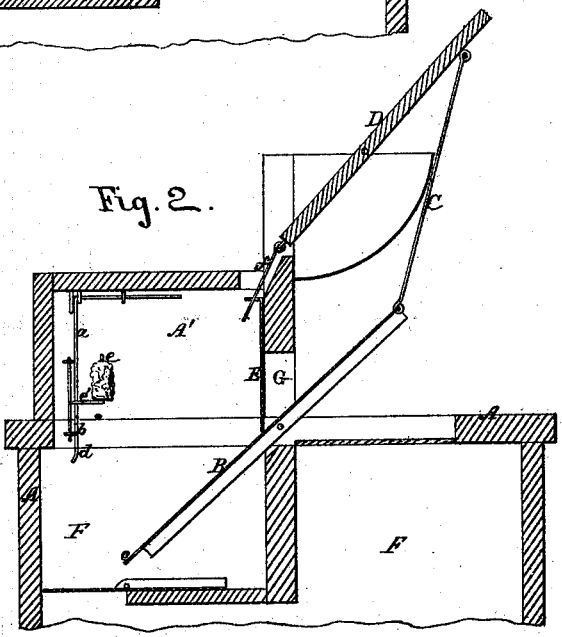
Figure 2 represents a similar view, showing the platform released and tilted, and the entrance door closed behind the animal.
Figure 4:
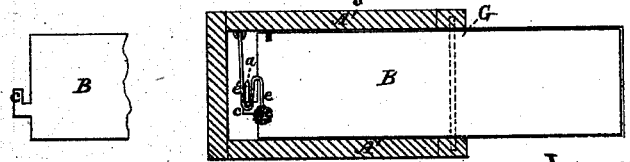
Figure 4, a top view of the same.

The locking and tripping device is arranged at one end of the platform B, and consists of a pendent wire rod, $a$, having a stop, $b$, on its lower end, upon which a lip, $c$, on the end of the tilting platform, rests when the trap is set, as shown in fig. 1, so as to support the platform B in a perfectly rigid position until the animal in seizing the bait either pulls or pushes the stop $b$ from the supporting-lip.

The stop $b$ is formed in a peculiar manner by bending the wire rod $a$ horizontally just above the level of the platform B, then carrying it below the platform, so as to form a guide, $d$, to render the platform self-setting, and the stop $b$ at the top of said guide.

The stop $b$ and guide $d$ are capable of swinging in the arc of a circle toward and from the end of the platform, and the sustaining lip $c$ of the latter is made like an L, so that the least movement of the stop will release the lip $c$ and allow the platform to descend.

The bait-holder may be arranged upon the hinged stop-rod $a$, but I prefer to have a separate bait-holder hinged to the side of the frame like a crane, carrying, besides the bait-holder $e$, a horizontal staple-shaped stop, $e'$, to hold the stop $b$ from swinging too far to one side beneath the sustaining and tripping-lip $c$ of the platform.

The bait-holder $e$, however, is free to swing with the tripping-stop $b$ in the arc of a circle toward and from the platform.

The rear end of the tilting platform B is connected by a vertical rod, C, to a horizontal counterbalance, D, pivoted to the top of the frame.

The opposite end of the counterbalance is connected by a link-rod, $f$, to a vertical gate, E, which remains open when the trap is set, but descends with the platform to close the passage G, through which the animal approaches the bait.

This door is not deemed necessary, but is used in case the animal should hold on by any means to the tilted platform.

It will be seen that the connecting-link $f$ is attached to the gate E, so as to allow the latter to descend by its own weight and not interfere with the tilting of the platform.

The moment the platform is relieved of the animal the counterbalance arm D brings it up against a stop-pin, $i$, and also raises the gate.

As the platform rises its projecting lip $c$ comes in contact with the guide-arm $d$ of the sustaining-stop $b$, pushes it aside until it reaches the stop, which then seeks a vertical line, and passes directly beneath the sustaining-lip $c$ of the platform, and thus sets itself, the only requirement being that the trap must set level.

Having described my invention,

I claim—

The combination of the suspended tripping detent or stop $b$ with the projecting lip $c$ of the platform B, and the suspended self-setting guide-arm $d$, arranged and operating as described.

In testimony whereof I have hereunto signed my name.

WM. D. WRIGHTSON.

Witnesses:
A. E. H. JOHNSON,
J. W. HAMILTON JOHNSON.